United States Patent
Zaccardi et al.

(10) Patent No.: US 11,015,468 B2
(45) Date of Patent: May 25, 2021

(54) OUTLET GUIDE VANE FOR TURBOMACHINE, COMPRISING A LUBRICANT COOLING PASSAGE EQUIPPED WITH A THERMAL CONDUCTING MATRIX COMPRESSED BETWEEN THE INTRADOS AND EXTRADOS WALLS

(71) Applicant: SAFRAN AIRCRAFT ENGINES, Paris (FR)

(72) Inventors: Cedric Zaccardi, Moissy-Cramayel (FR); Christophe Marcel Lucien Perdrigeon, Moissy-Cramayel (FR); Mohamed-Lamine Boutaleb, Moissy-Cramayel (FR); Dimitri Daniel Gabriel Marquie, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 188 days.

(21) Appl. No.: 16/126,028

(22) Filed: Sep. 10, 2018

(65) Prior Publication Data
US 2019/0078452 A1 Mar. 14, 2019

(30) Foreign Application Priority Data

Sep. 11, 2017 (FR) ...................... 17 58371

(51) Int. Cl.
*F01D 9/06* (2006.01)
*F28D 1/03* (2006.01)
(Continued)

(52) U.S. Cl.
CPC ............. *F01D 9/065* (2013.01); *F01D 9/041* (2013.01); *F01D 25/12* (2013.01); *F01D 25/18* (2013.01);
(Continued)

(58) Field of Classification Search
CPC .......... F01D 9/065; F01D 9/041; F01D 25/12; F01D 25/18; F28D 1/035; F02C 7/14; F28F 3/025; F02K 3/06; Y02T 50/60
See application file for complete search history.

(56) References Cited

U.S. PATENT DOCUMENTS 2,817,490 A * 12/1957 Broffitt .................... F01D 5/188
416/92
6,524,074 B2 * 2/2003 Farrar ....................... F01D 5/28
416/229 A
(Continued)

FOREIGN PATENT DOCUMENTS

FR 2 989 110 A1 10/2013
FR 3 046 811 A1 7/2017

OTHER PUBLICATIONS

French Preliminary Search Report dated May 18, 2018 in French Application 17 58371 filed on Sep. 11, 2017 (with English Translation of Categories of Cited Documents).

*Primary Examiner* — David E Sosnowski
*Assistant Examiner* — Hakeem M Abdellaoui
(74) *Attorney, Agent, or Firm* — Oblon, McClelland, Maier & Neustadt, L.L.P.

(57) ABSTRACT

A guide vane arranged in an air flow from a fan of an twin-spool aircraft engine, the aerodynamic part of the vane including an internal lubricant cooling passage partly delimited by an extrados wall and an extrados wall of the vane. The passage is equipped with a heat conduction matrix compressed between the walls and separating a first lubricant circulation space from a second lubricant circulation space. Furthermore, the matrix defines firstly first contact elements of the intrados wall formed in the first space and between which the lubricant from the first space will circulate, and secondly second contact elements of the extrados (Continued)

wall formed in the second space and between which the lubricant from the first space will circulate.

6 Claims, 5 Drawing Sheets

(51) Int. Cl.
  *F02C 7/14* (2006.01)
  *F28F 3/02* (2006.01)
  *F01D 9/04* (2006.01)
  *F01D 25/12* (2006.01)
  *F01D 25/18* (2006.01)
  *F02K 3/06* (2006.01)
  *F28D 21/00* (2006.01)

(52) U.S. Cl.
  CPC .............. *F02C 7/14* (2013.01); *F02K 3/06* (2013.01); *F28D 1/035* (2013.01); *F28F 3/025* (2013.01); *F05D 2220/323* (2013.01); *F05D 2230/20* (2013.01); *F05D 2230/54* (2013.01); *F05D 2250/75* (2013.01); *F05D 2260/20* (2013.01); *F05D 2260/213* (2013.01); *F05D 2260/98* (2013.01); *F05D 2300/173* (2013.01); *F05D 2300/174* (2013.01); *F28D 2021/0026* (2013.01)

(56) References Cited

U.S. PATENT DOCUMENTS

| | | | |
|---|---|---|---|
| 7,377,098 B2* | 5/2008 | Walker | F01D 9/065 |
| | | | 60/39.08 |
| 8,616,834 B2 | 12/2013 | Knight, III et al. | |
| 9,556,745 B2* | 1/2017 | Papin | F01D 5/147 |
| 10,392,952 B2* | 8/2019 | Zaccardi | F02C 7/14 |
| 2004/0151585 A1* | 8/2004 | Jones | F01D 5/16 |
| | | | 416/90 R |
| 2015/0000865 A1 | 1/2015 | Ueda | |
| 2017/0159489 A1* | 6/2017 | Sennoun | F02C 7/185 |
| 2018/0023416 A1* | 1/2018 | Riaz | F28D 15/0275 |
| | | | 415/1 |
| 2019/0078452 A1* | 3/2019 | Zaccardi | F02K 3/06 |
| 2019/0249558 A1* | 8/2019 | Zaccardi | F01D 9/065 |
| 2019/0338661 A1* | 11/2019 | Zaccardi | F28D 1/0246 |

* cited by examiner

OUTLET GUIDE VANE FOR TURBOMACHINE, COMPRISING A LUBRICANT COOLING PASSAGE EQUIPPED WITH A THERMAL CONDUCTING MATRIX COMPRESSED BETWEEN THE INTRADOS AND EXTRADOS WALLS

TECHNICAL DOMAIN

This invention relates to the field of twin-spool turbomachines for aircraft, and particularly the design of guide vanes arranged in all or part of a turbomachine bypass air flow.

These are preferably "Outlet Guide Vanes" (OGV), designed to straighten the air flow at the fan outlet. Alternatively or simultaneously, the guide vanes could be placed at the fan intake. The guide vanes are conventionally located in the turbomachine bypass flow.

The invention preferably relates to an aircraft turbojet fitted with such outlet guide vanes.

STATE OF PRIOR ART

On some twin-spool turbomachines, it is known that outlet guide vanes can be installed downstream from the fan to straighten the outlet flow from the fan, and possibly also to perform a structural function. This structural function is intended to transfer forces from the centre of the turbomachine to an outer shell located along the prolongation of the fan case. In this case, an engine attachment is conventionally formed on or close to this outer shell, to form the attachment between the turbomachine and an aircraft attachment pylon.

It was also recently disclosed that the outlet guide vanes can be expected to perform an additional function. This is a heat exchange function between the outside air passing through the ring of outlet guide vanes, and lubricant circulating inside these vanes. This heat exchange function is for example known as disclosed in document U.S. Pat. No. 8,616,834, or document FR 2 989 110.

Lubricant to be cooled by the outlet guide vanes can originate from different zones of the turbomachine. It can be a lubricant circulating through lubrication chambers of roller bearings supporting engine shafts and/or the fan hub, or a lubricant used for lubrication of mechanical transmission elements of the Accessory Gear Box (AGB). Finally, it can also be used for lubrication of a fan drive reduction gearbox, when such a reduction gearbox is provided on the turbomachine to reduce the rotation speed of its fan.

Increasing lubricant needs require that the heat dissipation capacity associated with exchangers designed for cooling the lubricant should be adapted accordingly. The fact that a role of heat exchanger is assigned to the outlet guide vanes, as in the solutions in the two documents mentioned above, can in particular reduce or even eliminate conventional Air Cooled Oil Cooler (ACOC) type exchangers. Since these ACOC exchangers are generally formed in the fan flow path, reducing or eliminating them can limit disturbances in the fan flow and thus increase the global efficiency of the turbomachine.

Pads can be installed in the lubricant internal cooling passage to disturb the lubricant flow and increase the wetted area, to obtain a better heat exchange. These pads are intended to be fabricated in a single piece with the vane body. Their distal end is covered by a closing cap, that is fixed on the body of the vane after these pads have been made. Part fabrication tolerances must be very precise, particularly for the height of the pads, in order to guarantee contact between the distal end of the pads and the closing cover. The result is complex fabrication and high fabrication costs.

Consequently, there is a need to create a design to facilitate fabrication of such a vane with integrated exchanger.

PRESENTATION OF THE INVENTION

In order to at least partially satisfy this need, the first purpose of the invention is a guide vane designed to be positioned in all or some of an air flow in a twin-spool aircraft turbomachine fan, the guide vane comprising a root, a tip and an aerodynamic flow straightening part located between the root and the tip of the vane, said aerodynamic part of the vane comprising at least one internal lubricant cooling passage in a part delimited by an intrados wall and an extrados wall of the vane, the intrados wall forming part of the body of the vane and the extrados wall forming part of a closing cover of this body, or vice versa.

According to the invention, said internal passage is equipped with at least one heat conducting matrix compressed between the intrados and the extrados walls, said matrix separating a first lubricant circulation space also delimited by the intrados wall on one side of it, and a second lubricant circulation space also delimited by the extrados wall on the other side of it, and said matrix defining firstly first intrados wall contact elements located in the first space and between which the lubricant in the first space will circulate, and secondly second extrados wall contact elements located in the second space and between which the lubricant in the second space will circulate.

The invention thus ingeniously adds a heat conducting matrix in the internal lubricant cooling passage. The material and the geometry of the matrix are such that it can be compressed between the intrados and extrados walls, namely so that it is deformed from its initial shape adapted before its installation in the vane. This makes good contact possible between the matrix and the intrados and extrados walls, to assure optimum global thermal performance without the need for tight manufacturing constraints. The strain applied to the matrix inside the lubricant circulation passage makes it possible to adapt to any irregularity between the intrados and extrados walls, while remaining in contact with them. Obviously, strain by compression required for the matrix is possible because the matrix is flexible and/or deformable.

Consequently, the invention facilitates fabrication and low cost and gives better heat exchange performances.

The invention preferably includes at least any one of the following optional characteristics, taken in isolation or in combination.

Said internal passage is provided with several heat conduction matrices compressed between the intrados and extrados walls, said matrices being separated from each other along a length direction so as to define a lubricant zone that firstly collects lubricant from the first and second circulation spaces in the upstream matrix, and secondly to distribute lubricant to the first and second circulation spaces in the downstream matrix, between any two directly consecutive matrices.

In other words, in this preferred embodiment of the invention, discontinuities are formed between the matrices along the direction of the length of the vane, the direction along which lubricant circulates. This can result in several advantages, the main of which are mentioned below.

Firstly, if there is a large difference between the flow passing through the first space and the flow passing through the second space of the same matrix, the addition of one or several discontinuities can rebalance the distribution of these flows during circulation of lubricant in the internal passage in the vane.

Furthermore, if differential cooling occurs between the intrados and extrados walls, the lubricant temperature in the two spaces causes a pressure difference between these two spaces. The direct consequence is unbalancing of the flow distribution, which can reduce global heat exchange performances. The presence of one or several discontinuities in the matrices strongly reduces this risk.

Furthermore, since the vane is twisted, its profile varies throughout the internal lubricant cooling passage. Therefore thicknesses of fluid passages can vary along the direction of the length of the vane, and modify pressure losses with the result of causing an unbalance in the flow distribution. Once again, the discontinuities mentioned above can reduce this risk.

In conclusion on this preferred aspect of the invention, the introduction of discontinuities provides better control of the flow distribution between the first and second circulation spaces defined by the matrices, and consequently increases global heat exchange performances.

Preferably, the first and second contact elements are each generally tapered in shape, with a section that narrows towards its associated intrados or extrados wall.

The first and second contact elements each have an approximately plane contact end bearing on its associated intrados or extrados wall.

It is possible to arrange matters such that the matrix is more flexible at the location that will be compressed, in other words at the peak of the waves for contact elements, each of which is generally tapered in shape. The matrix would then be deformed in preference in these zones, rather than in the tapered flanks.

Another purpose of the invention is an aircraft turbomachine, preferably a turbojet, comprising a plurality of guide vanes like that described above, arranged downstream or upstream from a fan of the turbomachine.

Another purpose is a method of fabrication of such a vane, comprising the following steps:
 a) make said at least one heat conduction matrix;
 b) place the matrix in a part of said internal passage defined by the body of the vane;
 c) place said closing cover on the vane body, so as to compress and deform the heat conduction matrix; and
 d) fix the closing cover on the vane body.

Preferably, step a) is done by forming sheet metal, preferably by cold forming. Alternatively, additive fabrication could be envisaged, this type of manufacturing also being called 3D printing or direct fabrication. Additive fabrication of the heat conduction matrix may for example be done by any one of the following techniques:
 Selective Laser Melting" (SLM) or "Electron Beam Melting" (EBM);
 "Selective Laser Sintering" (SLS) or sintering by electron beam;
 any other type of powder solidification technique under the action of a medium to high power energy source, the principle being to melt or sinter a metallic powder bed by laser beam or electron beam.

Preferably, step b) of the method is done such that each of the first and second contact elements of the matrix has a curved contact end, and such that after step c) to put said closing cover into place, this contact end is approximately plane and bearing on its associated intrados or extrados wall. A local strain of these ends then occurs, to obtain certain and extended contact surfaces.

Step c) is preferably applied such that strain of the matrix is an elastic strain.

Finally, step d) is preferably implemented by welding, brazing or gluing.

Other advantages and characteristics of the invention will become clear after reading the following non-limitative detailed description.

BRIEF DESCRIPTION OF THE DRAWINGS

This description will be made with reference to the appended drawings among which.

DETAILED PRESENTATION OF PREFERRED EMBODIMENTS

Figure 1:
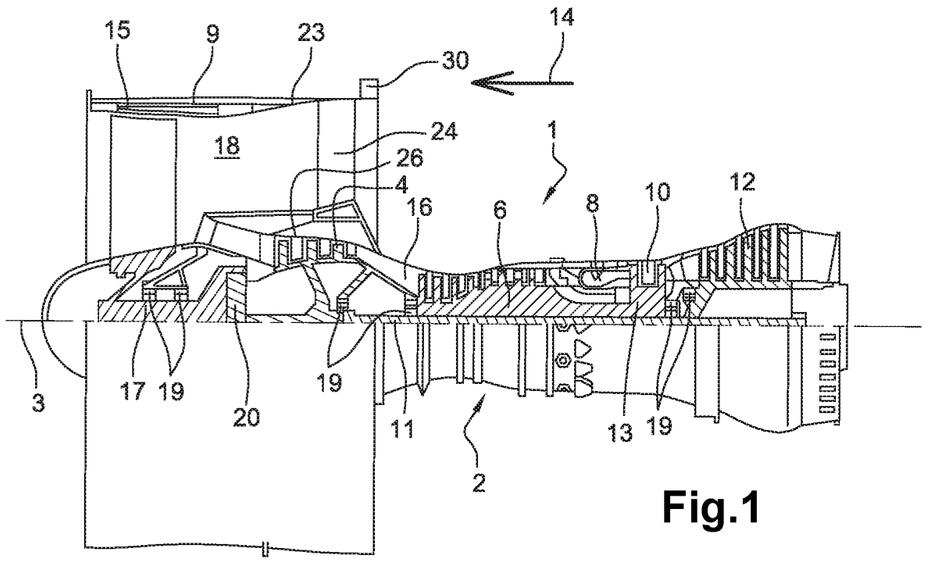
FIG. 1 diagrammatically represents a side view of a turbojet according to the invention.

With reference to FIG. 1, the figure represents a twin-spool twin-flow turbojet, with a high dilution ratio. The turbojet 1 conventionally comprises a gas generator 2 with a low pressure compressor 4 on one side and a low pressure turbine 12 on the other side, this gas generator 2 comprising a high pressure compressor 6, a combustion chamber 8 and a high pressure turbine 10. In the following, the terms "forward" and "aft" are considered along a direction 14 opposite to the main flow direction of gases in the turbojet, this direction 14 being parallel to the longitudinal axis 3 of the turbojet. On the other hand, the terms "upstream" and "downstream" are considered along the main flow direction of gases within the turbojet.

The low pressure compressor 4 and the low pressure turbine 12 form a low pressure case, and are connected to each other through a low pressure shaft 11 centred on the axis 3. Similarly, the high pressure compressor 6 and the high pressure turbine 10 form a high pressure case, and are connected to each other through a high pressure shaft 13 centred on the axis 3 and arranged around the low pressure shaft 11. The shafts are supported by bearing blocks 19 that are lubricated by being located in oil chambers. The same applies for the fan hub 17, also supported by roller bearings 19.

The turbojet 1 also comprises a single fan 15 located forward from the gas generator 2 and the low pressure compressor 4, that in this case is located directed aft from an engine nose dome. The fan 15 rotates about the axis 3, and is surrounded by a fan case 9. On FIG. 1, it is not driven by the low pressure shaft 11 directly, but is only driven by this shaft indirectly through a reduction gear 20, so that it can rotate at a lower speed. Nevertheless, a direct drive solution for the fan 15, by the low pressure shaft 11, is within the scope of the invention.

Furthermore, the turbojet 1 defines a core path 16 through which a core flow will pass, and a bypass path 18 through which a bypass flow will pass and that is radially outside the core flow, therefore the bypass flow being separated. As is well known to an expert in the subject, the fan flow path 18 is delimited radially externally partly by an outer shell 23, preferably metallic, prolonging the fan case 9 in the aft direction.

Although not shown, the turbojet 1 is equipped with a set of equipment, for example such as a fuel pump, a hydraulic pump, alternator, starter, variable stator vane (VSV) actuator, discharge valve actuator, or electrical power generator. In particular, there is equipment for lubrication of the reduction gear 20. This equipment is driven by an accessories gear box (AGB) (not shown) that is also lubricated.

There is a ring of guide vanes that in this case are outlet guide vanes 24 (OGV) in the bypass path 18, downstream from the fan 15. These stator vanes 24 connect the outer shell 23 to a casing 26 surrounding the low pressure compressor 4. They are circumferentially spaced from each other to straighten the bypass flow after it has passed through the fan 15. Furthermore, these vanes 24 can also perform a structural function, as is the case in the example embodiments described herein. They transfer forces from the reduction gear and roller bearings 19 of the engine shafts and the fan hub, to the outer shell 23. These forces can then transit through an engine attachment 30 fixed onto the shell 23 connecting the turbojet to an attachment pylon (not shown) of the aircraft.

Finally, in the example embodiments described herein, the outlet guide vanes 24 perform a third heat exchanger function between the bypass air flow passing through the ring of vanes, and the lubricant circulating inside these vanes 24. The lubricant that will be cooled by the outlet guide vanes 24 is the lubricant that lubricates the roller bearings 19, and/or the turbojet equipment, and/or the accessories gearbox, and/or the reduction gear 20. These vanes 24 thus form part of the fluid circuit(s) in which lubricant is circulated to lubricate the associated element(s) successively, and then to be cooled.

With reference to FIGS. 2 to 6, we will describe one of the outlet guide vanes 24, according to a first preferred embodiment of the invention. In this respect, it should be noted that the invention as it will be described with reference to FIGS. 2 to 6 can be applied to all vanes 24 of the stator ring centred on the axis 3, or only to some of these vanes.

Figure 2:
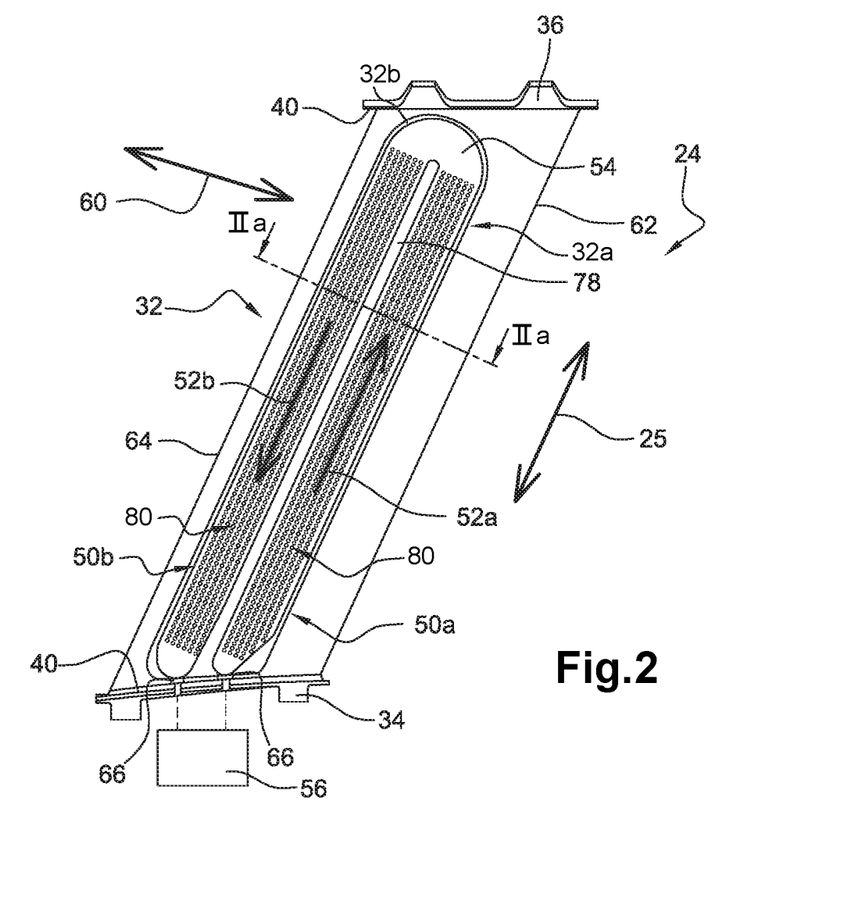
FIG. 2 represents a more detailed enlarged view of an outlet guide vane of the turbojet shown on the preceding figure, according to a first preferred embodiment of the invention.
Figure 3:
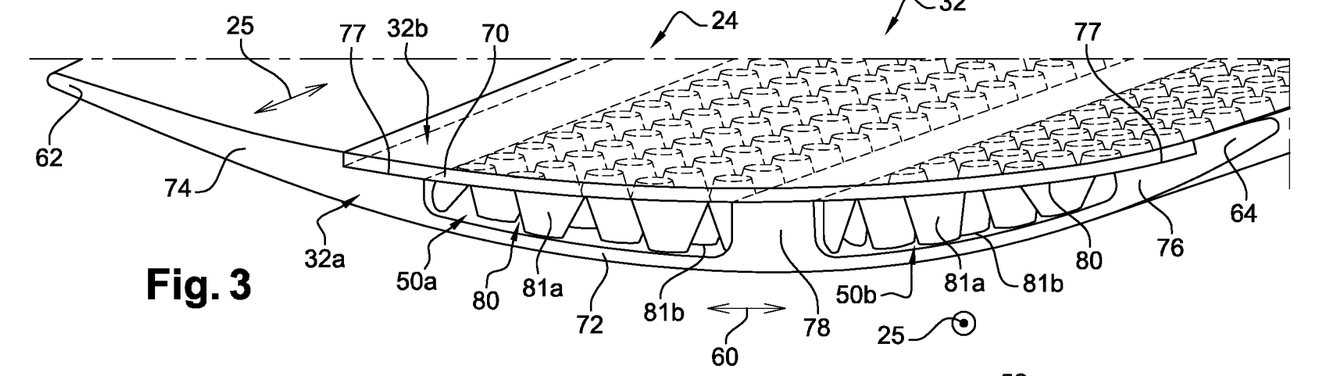
FIG. 3 is an enlarged perspective view of part of the outlet guide vane shown on the preceding figure.
Figure 4:
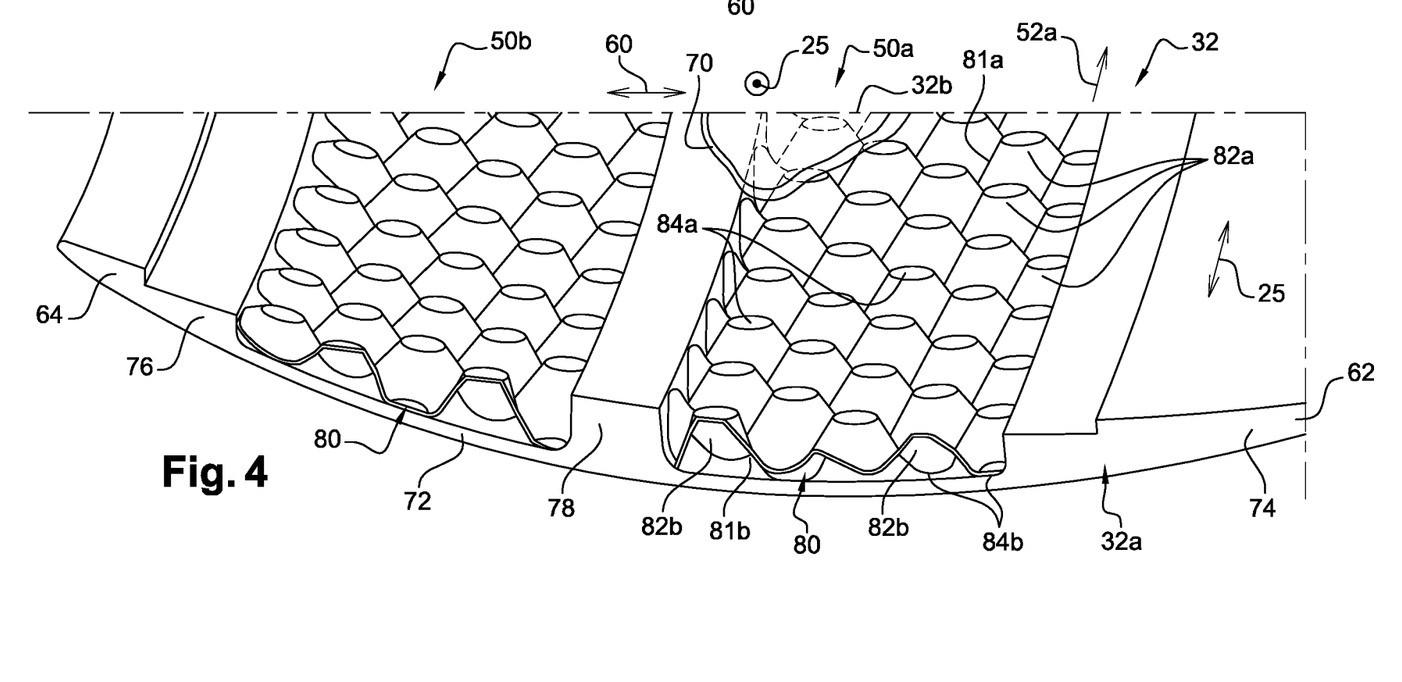
FIG. 4 is a perspective view similar to the view in the preceding figure, at another view angle and with the vane shown without its closing cover.
Figure 5:
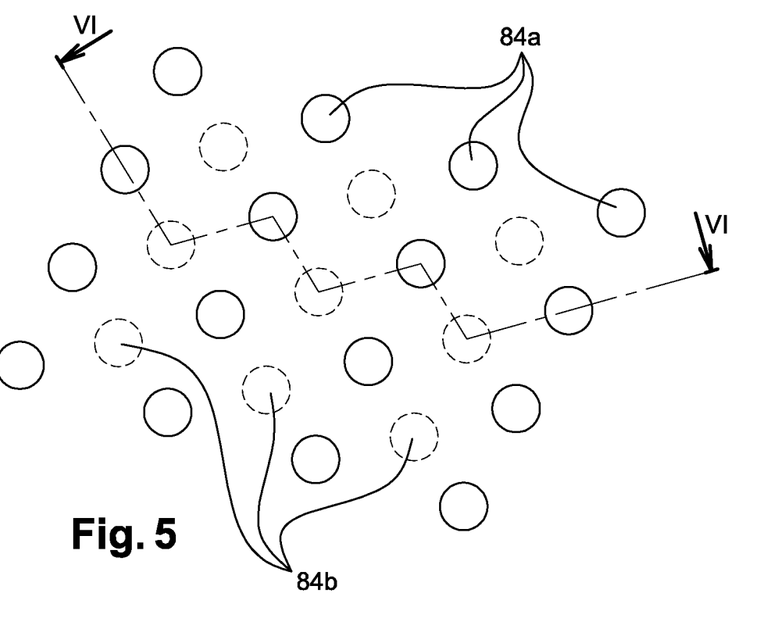
FIG. 5 is a front view of part of the vane shown on the preceding figure.

The vane 24 may be oriented precisely along the radial direction as shown on FIG. 1, or it can be slightly inclined in the axial direction as shown on FIG. 2. In all cases, it is preferably straight when viewed from the side as shown on FIG. 2, and extends along a direction of the length 25.

The outlet guide vane 24 comprises an aerodynamic part 32 that corresponds to its central part, in other words the part exposed to the fan flow. The vane 24 comprises a root 34 on one side of this aerodynamic part 32 straightening the outlet flow from the fan, and a tip 36 on the other side.

The root 34 is used to fix the vane 24 to the low pressure compressor case, while the tip is used to fix this vane onto the outer shell prolonging the fan case. Furthermore, the vane 24 comprises platforms 40 at its root and its tip to reconstitute the bypass path between the vanes 24 along the circumferential direction.

The aerodynamic part 32 of the vane is preferably fabricated in two distinct parts, then put together and firmly fixed to each other. The first step is a vane body 32a, that includes not only a large part of the aerodynamic part 32, but also the root 34, the tip 36 and the platforms 40. This body 32a is made in a single piece. The other part is formed by a cover 32b closing the body, and fixed to it by a conventional technique such as welding, brazing or gluing.

In this first preferred embodiment of the invention, the aerodynamic part 32 is equipped with two internal passages 50a, 50b approximately parallel to each other and parallel to the length direction 25. More precisely, a first internal lubricant cooling passage 50a extends along a first main flow direction 52a of the lubricant. This direction 52a is approximately parallel to the length direction 25, along the direction from the root 34 towards the tip 36. Similarly, there is a second internal lubricant cooling passage 50b that extends along a second main flow direction 52b of the lubricant, within this passage. This direction 52b is also approximately parallel to the length direction 25, along the opposite direction from the tip 36 towards the root 34. Therefore the first passage 50a is designed so that lubricant can pass through it radially outwards, while the second passage 50b is designed so that lubricant passes through it radially inwards. The radially outer ends of the two passages 50a, 50b are provided with a fluid connection passing through a 180° bend 54, corresponding to a hollow formed in the aerodynamic part 32, close to the tip 36, to connect one passage to the other. Alternatively, the passages 50a, 50b are not connected to each other within the aerodynamic part 32 of the vane 24, but each extends separately over the entire length of the aerodynamic part 32. A fluid connection can be made between the two passages outside the vane 24, for example using a connection bend formed radially outwards from the vane tip 36, for example bearing on this tip.

The internal radial ends of the two passages 50a, 50b are connected to the lubricant circuit 56, diagrammatically represented by element 56 on FIG. 2. In particular, this circuit 56 comprises a pump (not shown), that imposes the required circulation direction on the lubricant through the passages 50a, 50b, namely to introduce lubricant through the inner radial end of the first passage 50a, and to extract lubricant through the inner radial end of the second passage 50b. Connectors 66 make the fluid communication between the internal radial ends of the passages 50a, 50b and the circuit 56, these connectors 66 passing through the root 34.

The two passages 50a, 50b and the bend 54 together generally form a U shape, with the first passage 50a and the second passage 50b offset from each other along a transverse direction 60 of the vane approximately orthogonal to the length direction 25. Heat exchanges are optimised by having the first passage 50a adjacent to a trailing edge 62 of the vane 24, while the second passage 50b is adjacent to a leading edge 64. However, an inverse situation can be adopted without going outside the scope of the invention. Note also that the invention may include an aerodynamic part 32 with only one internal cooling passage, without going outside the framework of the invention. In this case, lubricant would pass through some of the vanes from inside to outside, while lubricant would pass through other vanes in the opposite direction.

Figure 6:
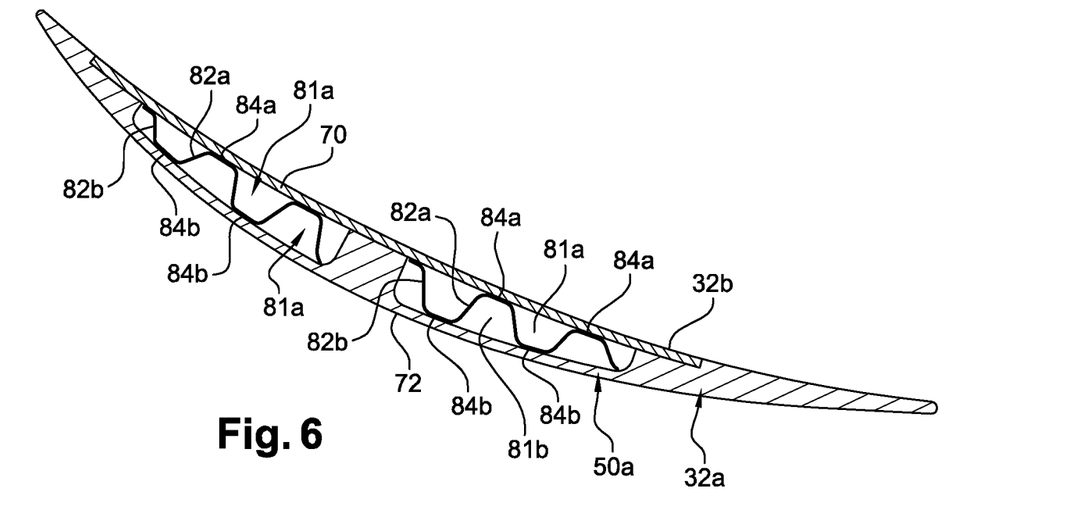
FIG. 6 corresponds to a sectional view along line VI-VI in FIG. 5.

The aerodynamic part 32 of the outlet guide vane 24 comprises an intrados wall 70, an extrados wall 72, a solid zone 74 connecting the two walls 70, 72 close to the trailing edge 62, a solid zone 76 connecting the two walls 70, 72 close to the leading edge 64, and a central solid zone 78. The latter zone 78 connects the two walls 70, 72 at an approximately central portion of the walls, along the direction of the chord of the vane. It also provides a structural reinforcement and extends from the root 34 to the bend 54, while the solid zones 74, 76 extend approximately along the entire length of the part 32, along the length direction 25. The first passage 50a is formed between the walls 70, 72 and between the solid zones 74, 78, while the second passage 50b is formed between the walls 70, 72 and between the solid zones 76, 78. The intrados and extrados walls 70, 72 have approximately constant thicknesses facing the passages 50a, 50b that they delimit. On the other hand, the passages 50a, 50b extend in the transverse direction 60 with a variable thickness between the two walls 70, 72. The maximum thickness of these passages may be of the order of a few millimetres. Alternatively, the passages 50a, 50b could have a constant thickness, but in this case the two walls 70, 72 would have a variable thickness to obtain the aerodynamic profile of the vane.

In this respect, note that the extrados wall 72 is integrated into the body 32a of the vane, while the intrados wall 70 is integrated into the cover 32b, the latter extending between the solid zones 74, 76 that it partly forms. In this respect, the solid zones 74, 76 have indentations forming bearing and attachment zones of the cover 32b onto the body 32a. These indentations 77, with a depth approximately equal to the thickness of the closing cover 32b, enable a flush aerodynamic junction between these two components 32a, 32b.

The two internal lubricant cooling passages 50a, 50b are specific in that they include one or several heat conduction matrices 80. The presence of the matrices can improve heat exchange performances, particularly because it provides an increase in the wetted area on the side of the lubricant that passes through the passages 50a, 50b. This matrix 80 also disturbs the lubricant passage, thus generating turbulence that directly influences the convection coefficient of lubricant passing through the matrix. Such a matrix can thus be defined so as to maximise the exchange performance while minimising head losses between the vane inlet and outlet.

Thermal performances can be improved by making the matrix 80 from a material different from the material of the body 32a and the cover 32b. In other examples mentioned for information, the matrix 80 can be made from an alloy based on aluminium or titanium. Its global volume may include a thickness of the order of several millimetres, that corresponds to the thickness of the internal passage in which it is housed.

In the first preferred embodiment, a single heat conduction matrix 80 is provided in each internal passage 50a, 50b. The designs of each of these two matrices 80 are practically identical or are similar. Their densities are also identical to or similar to the densities of the contact elements, but it could be arranged otherwise without going outside the framework of the invention. Consequently, only the matrix 80 of the first internal passage 50a will be described below, but it should be understood that this description is equally applicable by analogy to the matrix of the second internal passage 50b. It is also noted that the bend 54 defines an internal space that is preferably free of pads. It remains empty, or it may be fitted with concentric walls guiding the lubricant from one passage to the next.

The matrix 80 is unusual in that it can be compressed between the intrados wall 70 and the extrados wall 72. Consequently, the contact of the matrix 80 with these two walls is guaranteed, and thermal performances are improved. The matrix 80 is in the form of a complex shaped metal sheet that separates a first lubricant circulation space 81a from a second lubricant circulation space 81b. The first space 81a is also delimited by the intrados wall 70 and by solid zones 74, 78. The second space 81b is also delimited by the extrados wall 72 and by solid zones 74, 78. Consequently, lubricant that penetrates into the first space 81a cannot pass into the second space 81b before it exits from the matrix, and vice versa.

The matrix 80 firstly defines the first intrados wall contact elements, referenced 82a. These elements 82a are approximately orthogonal to the direction 52a. Each of them is generally tapered in shape with an axis approximately orthogonal to the intrados wall 70, and with a section that narrows in the direction towards this wall. Each element 82a terminates in an approximately plane contact end 84a, bearing on the intrados wall 70. This approximately plane end corresponds to a part of the matrix that is deformed elastically due to compression of the matrix between the body 32a and its closing cover 32b. Its diameter is of the order of 0.5 to 10 mm.

Similarly, the matrix 80 then defines second contact elements of the intrados wall, reference 82b. These elements 82b are approximately orthogonal to the direction 52a. Each of them is generally tapered in shape with an axis approximately orthogonal to the extrados wall 72, and with a section that narrows in the direction towards this wall. Each element 82b terminates in an approximately plane contact end 84b, bearing on the extrados wall 72. This approximately plane end corresponds to a part of the matrix that is deformed elastically due to the compression of the matrix between the body 32a and its closing cover 32b. Its diameter is also of the order of 0.5 to 10 mm.

The first contact elements 82a are located in the first lubricant circulation space 81a, inside which the lubricant will flow between these elements 82a arranged in rows. Similarly, the second contact elements 82b are located in the second lubricant circulation space 81b, inside which the lubricant will flow between these second elements 82b also arranged in rows. Along the direction of the length 25, the rows of the first elements 82a are arranged in alternation with the rows of second elements 82b, preferably such that all contact ends 84a, 84b are staggered, as can best be seen on FIGS. 4 and 5.

In at least one passage zone 50a, and preferably in the entire passage zone, the contact elements 82a, 82b form a set of pads with a density equal for example to about 3 pads/$cm^2$. More generally, the average density is between about 1 and 5 pads/$cm^2$.

With reference once again to FIG. 2, during operation of the engine, lubricant circulating through the circuit 56 is introduced into the first internal passage 50a along the first radially outwards direction 52a. The lubricant temperature at this stage is high. Heat exchange then takes place between this lubricant following the matrix 80 of the first passage 50a, and the bypass flow following the external surface of the intrados and extrados walls. After having been redirected by the bend 54 into the second passage 50b, the lubricant is similarly cooled in this passage, still by heat exchange with the bypass air flow, while circulating along the second main flow direction 52b. The cooled lubricant is extracted from the vane 24 and redirected through the closed circuit 56 towards elements to be lubricated and/or to a lubricant tank from which the lubricant is pumped to lubricate elements.

Figure 7:
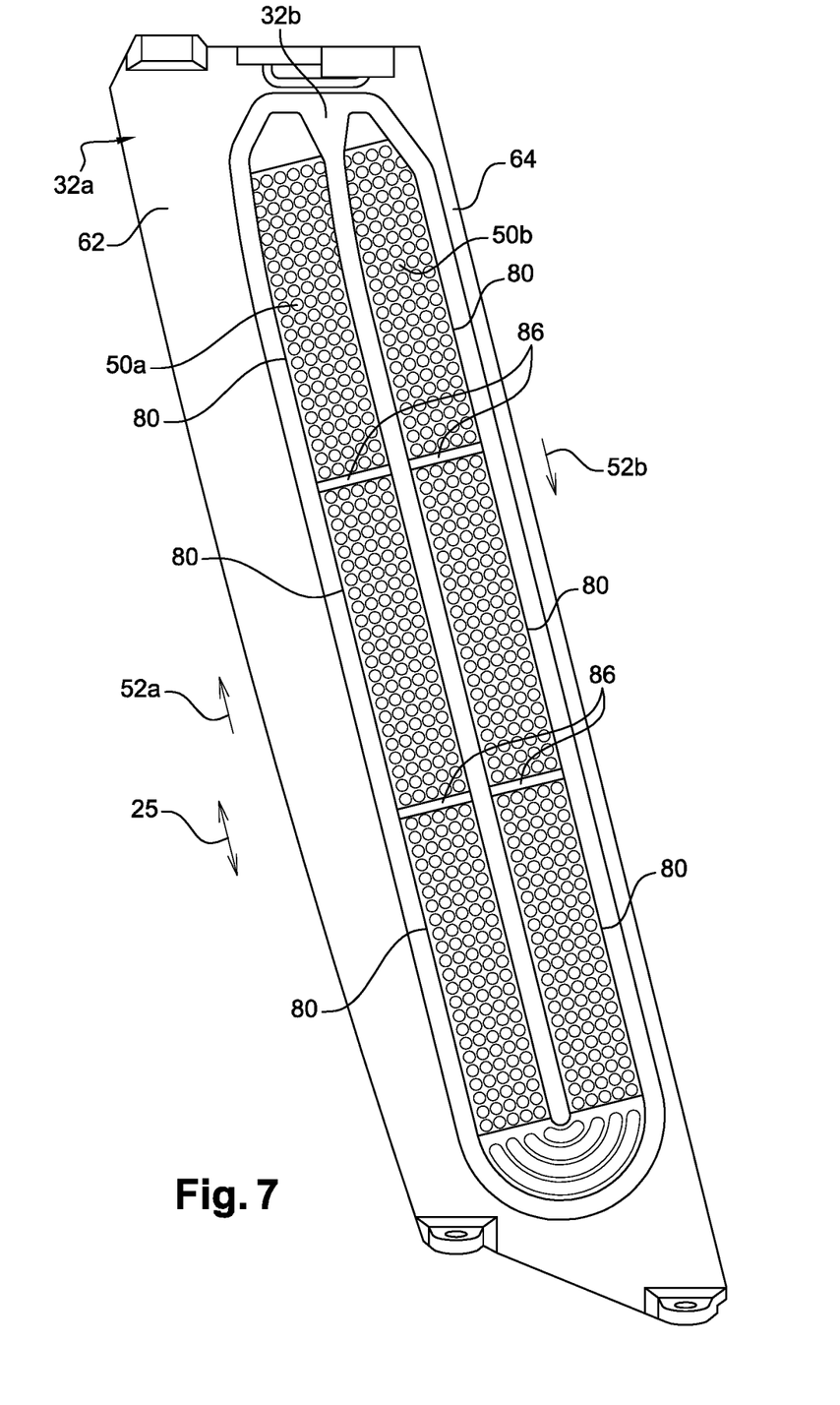
FIG. 7 is a view similar to the view in FIG. 2, with the vane according to a second preferred embodiment of the invention.

FIG. 7 shows a second preferred embodiment in which each internal passage 50a, 50b is equipped with several heat conducting matrices compressed between the intrados wall 70 and the extrados wall 72.

In each passage 50a, 50b, the matrices 80 succeed each other along the direction of the length 25, corresponding to the principal directions of the lubricant flow 52a, 52b. These matrices 80 are at a spacing from each other along the direction of the length 25 so as to define a lubricant zone 86 for which the section corresponds to the section of the associated passage 50a, 50b, between any two directly consecutive matrices. In other words, each lubricant zone 86 is preferably left free so that it can be used to collect lubricant from the first and second circulation spaces of the matrix 80 that is furthest upstream along the lubricant flow direction. This zone 86 is then used for the distribution of lubricant to the first and second circulation spaces directly consecutive of the matrix 80 in the downstream direction. Consequently, these lubricant zones 86 form discontinuities in the heat exchange structure, which in particular makes it possible to rebalance the flow distribution between the first and second circulation spaces before lubricant enters each new matrix 80.

Figure 8A:
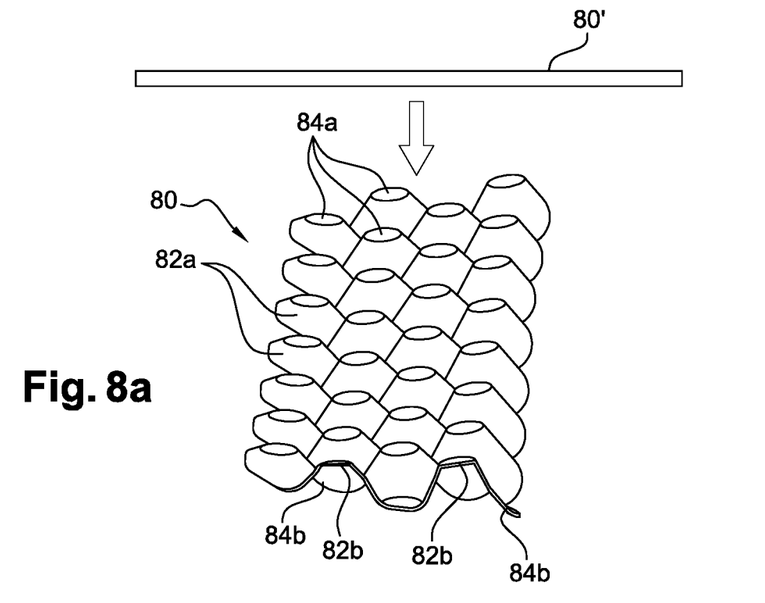
FIGS. 8a to 8c illustrate different steps in a fabrication method representative of the assembly of the vane shown on the preceding figure.
Figure 8B:
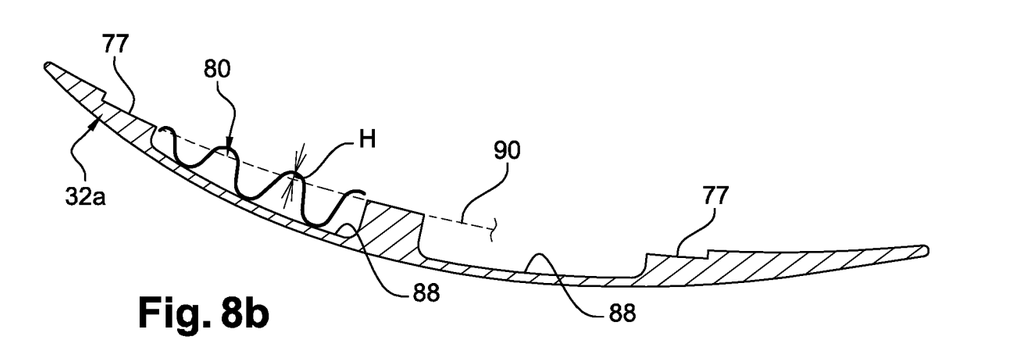
Figure 8C:
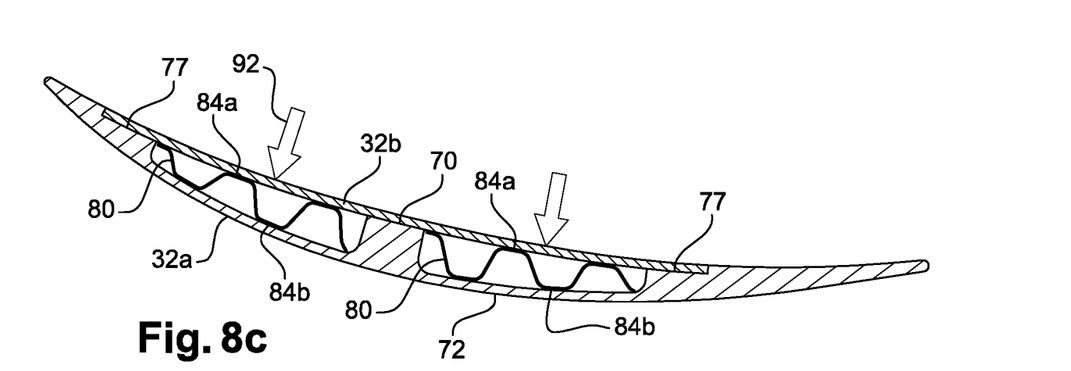

FIGS. 8a to 8c show different steps in a method of fabricating a vane according to one of the embodiments described above.

Firstly, there is a step to fabricate each matrix 80, preferably by cold forming of an initially plane plate 80'. This plate 80', shown on FIG. 8a, is of the order of 0.08 to 3 mm thick. It is formed by applying a strain of the order of 50 to 70%, so as to create the contact elements 82a, 82b. After this forming, the contact ends 84a, 84b are curved, and are no longer plane.

During a next step, called step b), the matrices 80 are put into place in a part 88 of the internal passage defined by the body of vane 32. This step b) is shown diagrammatically on FIG. 8b. Once housed in the part 88 of the passage, the matrix 80 in the unstressed state extends beyond the delimitation that will subsequently be formed by the closing cover 32b, this delimitation being shown diagrammatically by the dashed line 90. For example, the matrix 80 can exceed the limitation 80 by a height H of up to 5 mm.

The next step is a step c) to fit a closing cover 32b on the vane body 32, applying a sufficiently large force 92 on the cover 32b so that the cover comes into contact with the indentations 77 in the body 32a. For example, this force 92 may be of the order of 10 to 10 000 N. During placement of the cover 32b, each matrix 80 is compressed and is elastically deformed between the intrados wall 70 and the extrados wall 72. During this phase, the contact ends 84a, 84b deform locally progressively losing their curved shape to adopt an approximately plane shape, matching the internal surfaces of the walls 70, 72 over a larger surface area. This step c), shown diagrammatically on FIG. 8c, can be done due to the relative flexibility of the matrix 80, that is therefore capable of deforming elastically and locally at the contact ends, to adapt perfectly to the distance between the two walls 70, 72. It will be noted that the strain can also be plastic without going outside the framework of the invention.

Finally, a step d) consists of fastening the closing cover on the vane body, preferably by gluing, welding or brazing.

Obviously, an expert in the subject can make various modifications to the invention as it has just been described solely through non-limitative examples. In particular, the technical characteristics specific to each embodiment described above can be combined together without going outside the scope of the invention. Finally, note that in the case (not shown) of inlet guide vanes to straighten the air flow upstream from the fan, these vanes are located in the entire fan air flow around a non-rotating air inlet cone, the roots of the vanes then being connected to this fixed air inlet cone.

Furthermore, other engine architectures known as "aircraft twin-spool turbomachines" also lie within the framework of the invention. For example, it could be a three-spool architecture (namely comprising three shafts connecting first turbine stages to a fan, second turbine stages to low pressure compressor stages, and third turbine stages to high pressure compressor stages), or even an open rotor architecture comprising guide vanes, such as an engine with an open "bypass flow" including a fast propeller acting as a fan and a guide vane stator fixed at a position along the aft direction, but without an external case.

The invention claimed is:

1. A guide vane designed to be positioned in all or some of an air flow in a twin-spool aircraft turbomachine fan, the guide vane comprising a root, a tip and an aerodynamic flow straightening part located between the root and the tip of the vane, said aerodynamic part of the vane comprising at least one internal lubricant cooling passage in a part delimited by an intrados wall and an extrados wall of the vane, the intrados wall forming part of a body of the vane and the extrados wall forming part of a closing cover of this body
    wherein said internal passage is equipped with at least one heat conducting matrix compressed between the intrados wall and the extrados wall, said matrix separating a first lubricant circulation space also delimited by the intrados wall on one side of it, and a second lubricant circulation space also delimited by the extrados wall on the other side of it, and wherein said matrix defines firstly first intrados wall contact elements located in the first space and between which the lubricant in the first space will circulate, and secondly second extrados wall contact elements arranged in the second space and between which the lubricant in the first space will circulate;
    wherein said heat conducting matrix is elastically compressed between the intrados and extrados wall; and
    wherein the contact elements each include a plurality of contact ends which are configured such that, prior to compression between the intrados and extrados walls, the contact ends are rounded and, after compression, the contact ends are approximately planar and match the internal surfaces of the intrados and extrados walls.

2. The vane according to claim 1, wherein said internal passage is provided with several heat conduction matrices compressed between the intrados wall and the extrados wall, said matrices being separated from each other along a length direction so as to define a lubricant zone that firstly collects lubricant from the first and second circulation spaces in the upstream matrix, and secondly to distribute lubricant to the first and second circulation spaces in the downstream matrix, between any two directly consecutive matrices.

3. The vane according to claim 1, wherein the first and second contact elements are each generally tapered in shape forming a truncated cone, with a section that narrows towards its associated intrados or extrados wall.

4. The vane according to claim 1, wherein the first and second contact elements each have an approximately plane contact end bearing on its associated intrados or extrados wall.

5. A turbomachine for an aircraft, said turbomachine comprising a plurality of guide vanes according to claim 1, located downstream or upstream from a fan of the turbomachine.

6. The vane according to claim 1, wherein compression of said heat conducting matrix guarantees contact of the matrix with the intrados and extrados walls.

* * * * *

UNITED STATES PATENT AND TRADEMARK OFFICE
CERTIFICATE OF CORRECTION

PATENT NO. : 11,015,468 B2  
APPLICATION NO. : 16/126028  
DATED : May 25, 2021  
INVENTOR(S) : Zaccardi et al.

Page 1 of 1

It is certified that error appears in the above-identified patent and that said Letters Patent is hereby corrected as shown below:

In the Claims

In Column 10, Claim 1, Line 44, delete "and" and insert -- wall and the --, therefor.

Signed and Sealed this  
Eighth Day of March, 2022

Drew Hirshfeld  
*Performing the Functions and Duties of the*  
*Under Secretary of Commerce for Intellectual Property and*  
*Director of the United States Patent and Trademark Office*